Feb. 11, 1969   J. G. BRADFORD   3,426,367
COLLAPSIBLE SUPPORTING STRUCTURES
Original Filed Dec. 21, 1965

INVENTOR.
JOHN G. BRADFORD
BY~
ATTORNEYS

Feb. 11, 1969 J. G. BRADFORD 3,426,367
COLLAPSIBLE SUPPORTING STRUCTURES
Original Filed Dec. 21, 1965 Sheet 2 of 5
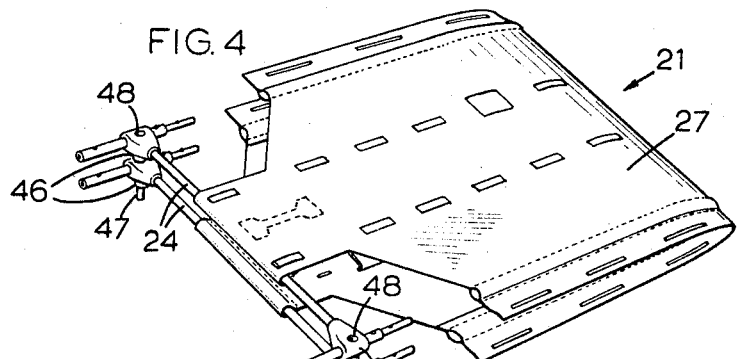
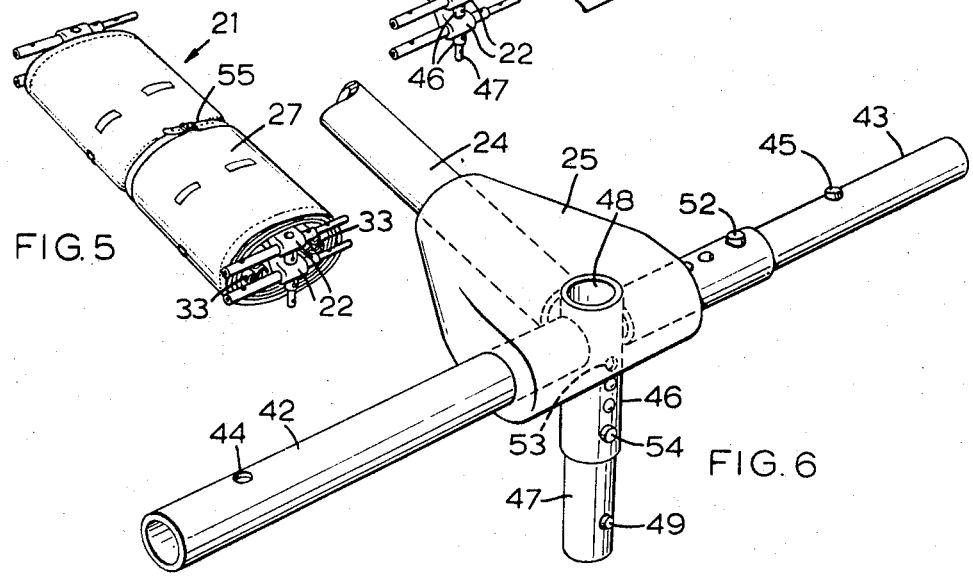
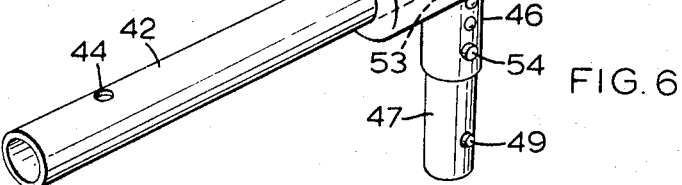
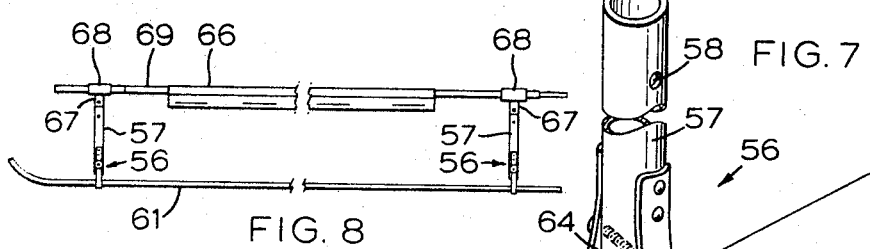
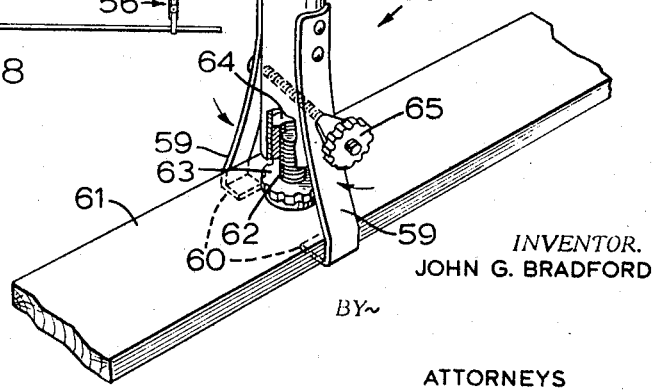
INVENTOR.
JOHN G. BRADFORD
BY
ATTORNEYS Feb. 11, 1969  J. G. BRADFORD  3,426,367
COLLAPSIBLE SUPPORTING STRUCTURES
Original Filed Dec. 21, 1965  Sheet 3 of 5

INVENTOR.
JOHN G BRADFORD
BY

ATTORNEYS

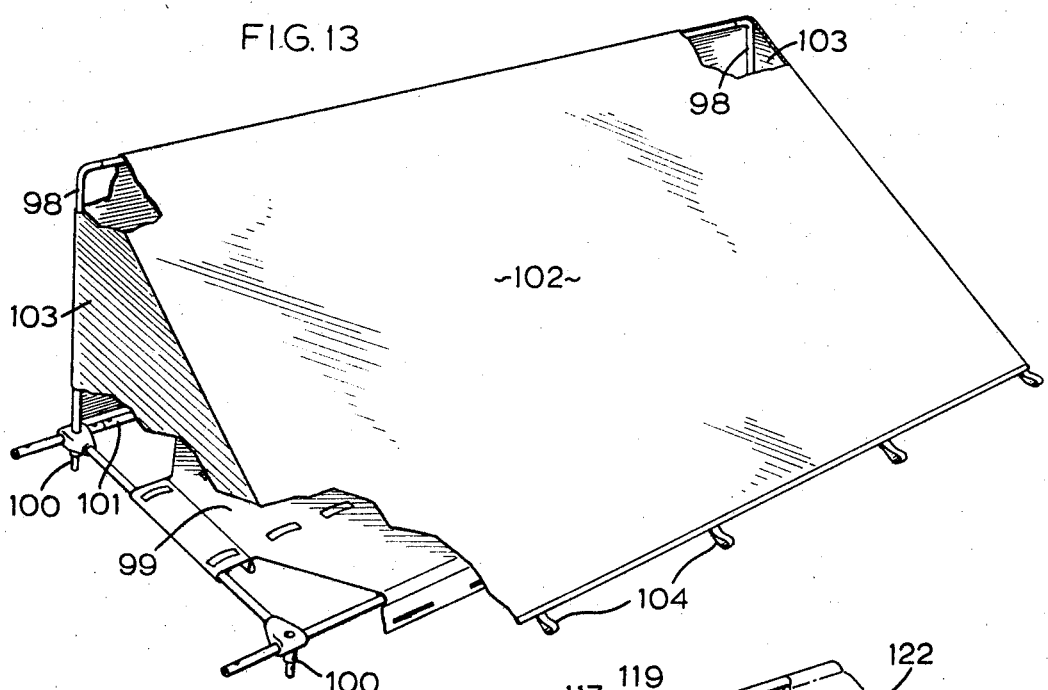
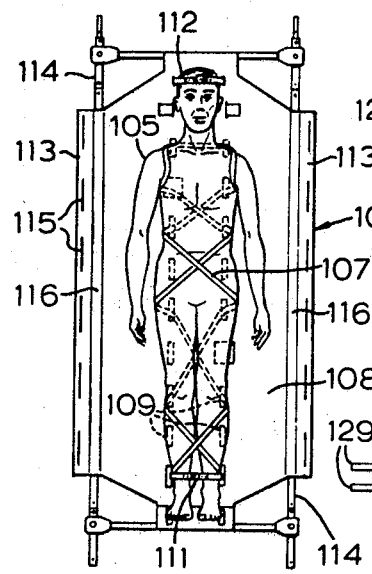
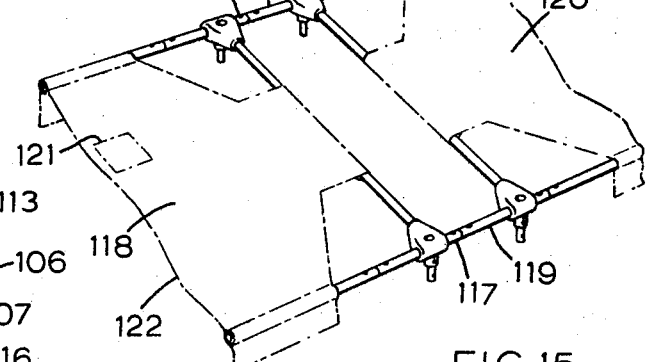
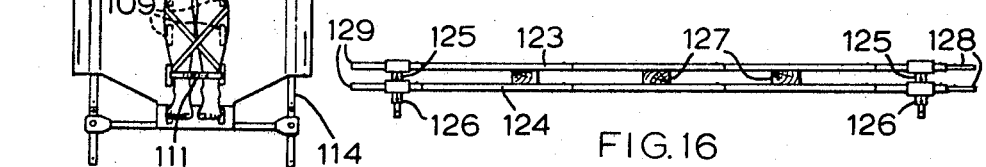

INVENTOR.
JOHN G. BRADFORD
BY~

ATTORNEYS

United States Patent Office

3,426,367
Patented Feb. 11, 1969

3,426,367
COLLAPSIBLE SUPPORTING STRUCTURES
John G. Bradford, 32 St. Margaret's Road,
Ancaster, Ontario, Canada
Original application Dec. 21, 1965, Ser. No. 515,347, now
Patent No. 3,336,060, dated Aug. 15, 1967. Divided and
this application June 22, 1967, Ser. No. 667,614
U.S. Cl. 5—82                                    17 Claims
Int. Cl. A61g 1/02; A47c 17/64

ABSTRACT OF THE DISCLOSURE

A collapsible and portable supporting frame having two end members and two side members, each of the end members comprising a tubular member subtended at each end by a housing and each side member comprising at least two tubular sections releasably socketed together, each end member being so constructed that it can be releasably attached by several socket means to the top of or to one end of another end member to form a variety of supporting structures.

---

This is a division of application Ser. No. 515,347, filed Dec. 21, 1965 now Patent No. 3,336,060.

The present invention relates to collapsible supporting structures and more particularly to collapsible structures which can be used for stretchers and adapted for a variety of other uses.

Heretofore, collapsible stretchers have been cumbersome and somewhat difficult to move about and, at the same time, the requirement of lightness therein has meant that the assembled stretcher is not overly rigid and strong. Collapsible stretchers are generally useful only as such and cannot be utilized for other means. There has been a pressing need in the military and medical fields for an all purpose stretcher device which is light, quickly assembled and disassembled, compact in the collapsed state and convertible for a number of other uses which eliminates the need for extra equipment which would be required for these other uses.

A novel collapsible supporting structure has now been discovered that can be adapted for a number of uses including not only a light, strong and easily assembled stretcher but also a ladder, a single or double bunk, a wheeled stretcher and a light bridge structure.

It is an object of the invention to provide a lightweight, easily assembled stretcher which can be quickly adapted for a variety of other uses and which can be easily and readily disassembled into a compact carrying unit.

A further object of the invention is to provide a novel, collapsible supporting structure which can be utilized not only as a stretcher but also, in combination with one or more of the same units, as a ladder of any desired length, a multiple tiered bunk, a bridge for lightweight vehicles and other quickly assembled supporting devices.

Other objects and advantages of the invention will become apparent from the following description taken in conjunction with the accompanying drawing in which:

FIG. 4 is a perspective view of a stretcher with side frame members removed and folded over prior to rolling up for carrying;

FIG. 5 is a perspective view of a stretcher folded over, as in FIG. 4, and rolled into a bundle with side frame members stowed for carrying;

FIG. 6 is a perspective view of a housing member at one end of an end frame member of a supporting structure embodying the invention;

FIG. 7 is a perspective view of a leg and ski attachment connectable to the structure shown in FIG. 6;

FIG. 8 is an elevational broken view of a complete ski attachment converting the stretcher for mountain rescues;

FIG. 13 is a perspective view of a further embodiment of the invention showing a stretcher adapted for a tent;

FIG. 14 is a plan view of a stretcher showing a person strapped thereto and illustrating the arrangement of the straps;

FIG. 15 is a perspective view of another embodiment of the invention showing the interconnection of stretchers to form a ladder;

FIG. 16 is an elevational view of still a further embodiment of the invention showing the utilization of two stretchers mounted one upon the other to form a structure suitable for use as a temporary bridge;

Generally speaking, the present invention relates to a collapsible and portable supporting structure comprising a rectangular tubular frame having two end frame members and two side frame members which are engageable with the end frame members. Each of the end frame members comprise a tubular connecting member subtended at each end by a housing member connected thereto. Each of the housing members has first and second tubes securely connected thereto and extending outwardly from opposite sides of the housing member substantially perpendicularly to the tubular connecting member. The first tube is of larger diameter than the second tube at the ends of the tubes away from the housing member. Each of the side frame members comprises at least two tubular sections releasably connected together. The end of one tubular section is adapted to releasably securely socket into the end of the next adjacent tubular section so that the tubular sections connect together to form an integral side frame member. The first tube on each housing member and one end of each side frame member are so adapted that the one end releasably securely sockets into the first tube. At the same time, the second tube on each housing member and the other end of each side frame member are so adapted that the second tube releasably securely sockets into the other end of the side frame member.

Figures 1, 2, 3:
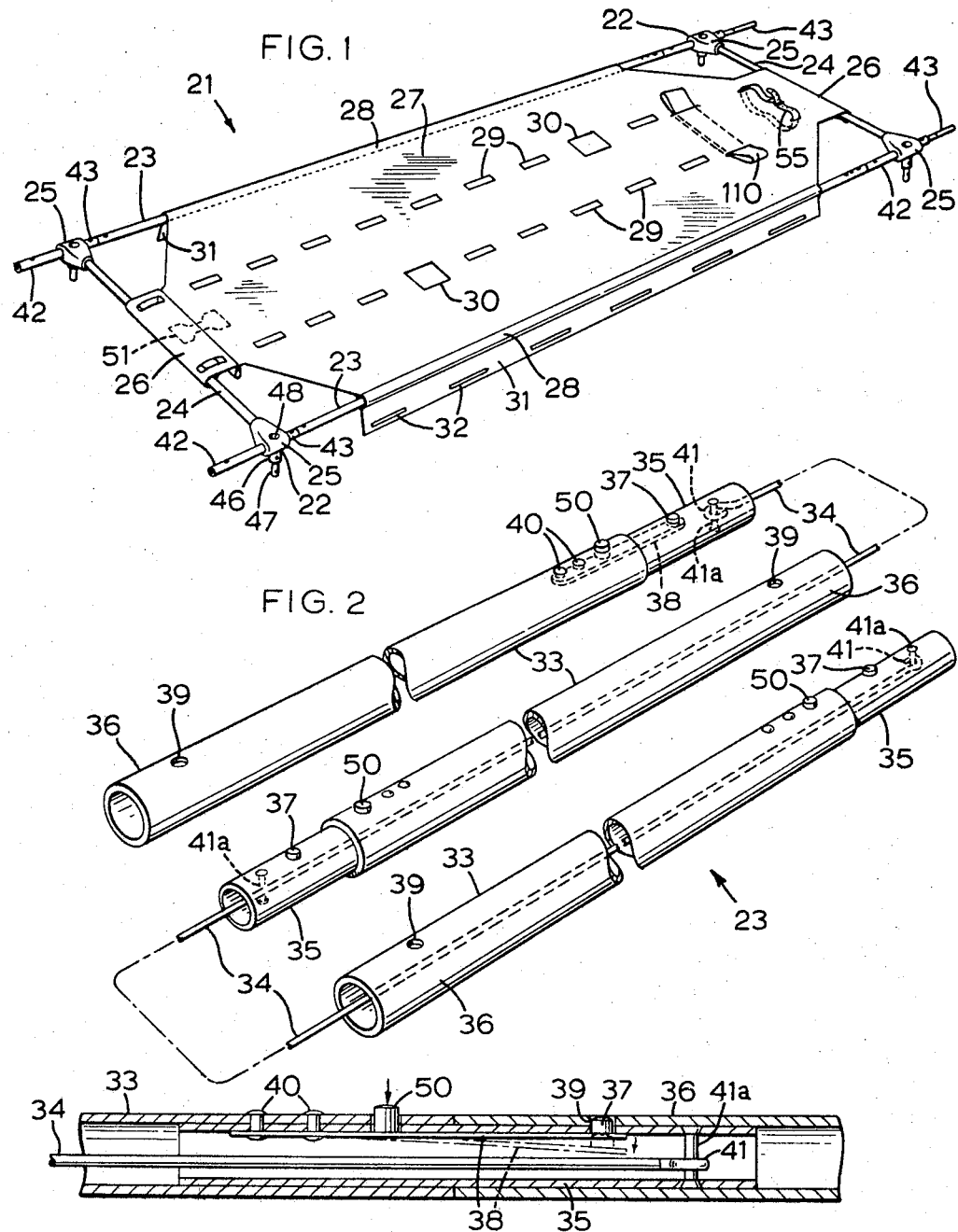
FIG. 1 is a perspective view of an assembled stretcher embodying the invention.
FIG. 2 is a broken perspective view of disassembled tubular members of a side frame member on the stretcher shown in FIG. 1.
FIG. 3 is a section view in elevation of a joint between two joined tubular sections of a side frame member.

Referring now to the drawing, and in particular to FIG. 1, a stretcher 21 embodying the invention comprises a rectangular tubular frame, advantageously constructed of a light metal, such as aluminum or an aluminum alloy, having two end frame members 22 and two side frame members 23 which are seen to be engageable with the end frame members 22. Each of the end frame members 22 comprises a tubular connecting member 24 subtended at each end by a housing member 25, described in detail hereinafter, integrally connected thereto. The end frame members 22 pass through end tubular sleeves 26 of a flexible sheet 27 of canvas or other suitable flexible material forming the bed of the stretcher 21 and the side frame members 23 pass through tubular sleeves 28 of the sheet 27. The flexible canvas sheet 27 is formed with a number of slots 29 therein, arranged in two parallel rows, through which pass the straps of a harness for securing an injured or otherwise incapacitated person to the stretcher, as will be described hereinafter. Two (or more) of these slots 29 are enlarged so as to act as footholds 30 and form intermediate rungs when the stretcher 21 is adapted for a ladder (see FIG. 15). The slots 29 and 30 may be circular since less strength would be lost in the sheet 27 thereby and they could be easily reinforced with aluminum or other metal eyelets. The sheet 27 extends at each side of the stretcher beyond the sleeves 28 to form two flaps 31, each flap 31 having a row of slots 32 therein, which can be used as additional securing means or handgrips for the stretcher.

Referring now to FIG. 2, each of the side frame members 23 has a plurality of tubular sections 33, three such sections being shown in FIG. 2 in disassembled form. The tubular sections 33 are connected by a length of elastic cord 34. The sections 33 are joined at their respective ends to an adjacent section by the secure socketing of small spigot end 35 of one into larger receiving end 36 of another. Referring also to FIG. 3, which illustrates a section through a joint between connected tubular sections, the sections are fastened securely together by a spring fastener comprising a location button 37 on a length of flat spring steel 38 on the small end 35 engaging in a locating hole 39 on the larger end 36. The spring 38 is rivetted to the inside of the spigot end 35 of the tubular section 33 by way of rivets 40. The length of the elastic cord 34 shown broken in FIG. 2, passes through each of the three tubular sections 33, its ends being anchored in the two outer sections by hooks 41 on the cord engaging small rods 41a transversing and attached to the interior of the tubular sections.

As aforedescribed, each end frame member 22 is subtended at each end by the housing or connecting member 25. Referring to FIG. 6, which is a perspective view of the housing member 25, the tubular connecting member 24 is shown integrally connected into the housing 25. First and second tubes 42, 43 respectively, are affixed in holes in the housing member 25 and extend outwardly at opposite sides thereof at right angles to the tubular member 24. The first tube 42 is a larger receiving tube adapted to receive the small spigot end 35 of a side frame member, shown in FIG. 2, and a locating hole 44 receives the location button 37 on the spigot end 35. The second tube 43 is a smaller spigot tube adapted to be located in the receiving end 36 of a side frame member, and a location button 45 in the smaller spigot tube 43 is received by the locating hole 39 on the larger receiving end 36. The smaller tube 43 contains a spring fastener with the location button 45 thereon similar to that used for interconnecting the tubular sections 33 of the side frame member 23.

It can be seen that the large and small tubes 42, 43 are the same diameter as the larger receiving end 36 and the smaller spigot end 35 respectively of the tubular sections 33 of a side frame member and that not only can side frame members be connected to the tubes 42, 43 on the housing 25 but also the housings can be interconnected one to another. At right angles to all of the tubes 24, 42, 43 on the housing is advantageously located a supporting tube 46, which is integrally connected into the housing 25 and which forms a leg or supporting post for the stretcher 21. The tube 46 which has a lower spigot portion 47 runs through the housing and has an upper open end 48 at the top of the housing 25 larger in diameter than the spigot portion 47. A location button 49 on a spring fastener, similar to those previously described, is contained on the lower portion of the tube 46.

The stretcher 21 is assembled by inter-connecting tubular sections 33 of the side frame members 23 by inserting the spigot ends 35 into the receiving ends 36 after depressing buttons 50 which in turn cause the springs 38 and the location buttons 37 to depress and take up the position shown by the broken line in FIG. 2. Release of the buttons 50 then allows the location buttons 37 to lock into place. The side frame members 23 are then inserted through the sleeves 28 of the stretcher 21 after they are connected to the housing members 25 at each end of the tubular connecting members 24. When the side frame members 23 have been locked in place the slack of the canvas is taken up by a canvas tightening brace 51, described hereinafter in conjunction with FIGS. 17 and 18.

In the stretcher arrangement shown in FIG. 1 the housing members 25 are placed with the spigot tubes 43 directed inwardly toward the canvas at one end and with the receiving tubes 42 directed outwardly at that end to form carrying handles. At the other end the housing members 25 are placed with the spigot tubes 43 directed outwardly to form carrying handles and the receiving tubes 42 directed inwardly. The side frame members are seen to be inserted in both sides of the canvas 27 with the receiving ends 36 connected over the spigot tubes 43 of the housings 25 at one end of the stretcher and the spigot ends 35 connected into the receiving tubes 42 of the housings 25 at the other end, connections being made in the same manner as disclosed for attachment of the tubular sections 33 of the side frame members 23, using the buttons 50 on the frame members 23 to depress the location buttons 37 and buttons 52 on the spigot tubes 43 to depress the location buttons 45.

With the arrangement of the housing members 25 as shown in FIG. 1 there are seen to be left hand and right hand housings required for the stretcher. Alternatively, a universal housing may be used and arranged in the stretcher with the spigot tubes facing in one direction on one side of the stretcher and in the other direction on the other side of the stretcher. In such case the handles at each end of the stretcher would consist of a spigot tube 43 and a receiving tube 42 on the housings 25 and the side frame members 23 would have to be inserted through the sleeves 28 in opposite directions.

The open upper end 48 of the leg or supporting post 46 receives the spigot end 35 of any side frame member 23 or the lower spigot portion 47 of another leg or supporting post on another stretcher. Separate pieces of the tubular sections 33 may also be provided for inserting in the upper end 48. A location hole 53 is provided in the tube 46, within the housing 25, for seating of the location buttons 37 or 49 on the tubular section 33 or another supporting leg respectively. Button 54 is used on the leg 46 to depress the location button 49, as before described in connection with other location buttons. It is to be noted that depressing buttons 50, 52, 54 can be eliminated from the spigot portions of the tubes with location buttons 37, 45, 49 being readily depressible by finger. Provision of a grooved portion across the location button receiving holes aids the depressing of location buttons by finger.

FIGS. 4 and 5 illustrate the method for collapsing and stowing the stretcher 21 and its parts. Thus, FIG. 4 is a perspective view of the stretcher, with side frame members 23 removed, folded upon itself and with the lower spigot portions 47 of the supporting posts 46 at one end inserted into the open upper ends 48 of the supporting posts 46 at the other end. The sheet 27 is then rolled around the connecting members 24, as shown in FIG. 5, and the side frame members 23 are dismantled, although still connected by the elastic cord 34, with the tubular sections 33 being stowed inside the sheet 27. Head strap 55 on the stretcher (see FIG. 1) is then used for holding the sheet 27 in a roll. The end frame members 22 are seen to remain attached to the end of the sheet 27. Alternatively the stretcher may be stowed with the bottom end frame member (as viewed in FIGS. 4 and 5) turned upwardly and no connection being made between the end frame members. This method of stowing provides a somewhat more compact bundle and eliminates the protruding of any spigot portion.

FIGS. 7 and 8 illustrate two views of an attachment 56 for a stretcher allowing the stretcher to be run on skiis. Referring to FIG. 7 a vertical tube member 57 (shown broken) is adapted at its upper end to receive the lower spigot portion of the supporting leg of a stretcher with the location button on the spigot portion seating in locating hole 58 in the tube member 57. Connecting arms 59 are rivetted on either side of the tube member 57 and the arms 59 are turned inwardly at lower ends 60 to embrace a ski 61, only a portion of which is shown. In order to make the attachment 56 fast to the ski a threaded bolt 62, with a turning head 63 thereon, is screwed into plug 64 in the end of the tube 57. By turning the bolt 62 to bear against the ski 61 vertical tensioning is provided for the attachment 56 against the ski. A horizontal adjusting screw 65 is provided through the arms 59 and the tube 57 for clamping the arms tightly around either side of the ski. Although the arms project onto the skiing surface, they do not in practice cause any difficulty in running, but can advantageously be constructed with thin edges to reduce obstruction. In FIG. 8 a broken plan view of a stretcher 66 attached to skiis 61 is depicted, with supporting legs 67 on end frame members 68 connected by side frame members 69 shown. The supporting legs 67 are spigotted into vertical tube members 57 of the attachments 56. Shorter vertical tube members may, if desired, be provided for the ski attachment with an interconnecting tubular section provided between the legs of the stretcher and the vertical tube member of the ski attachment. This ski attachment is particularly useful for moving casualties during mountain rescue operations.

Figure 9:
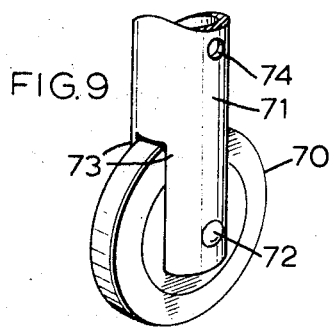
FIG. 9 is a perspective view of a wheel attachment for a stretcher.

Various other attachments can be fitted to the stretcher such as detachable wheels 70, one of which is shown in perspective in FIG. 9. The wheel 70 is housed in a short length of tube 71 by way of axle 72 running through housing portions 73 of the tube 71. A location hole 74 in the tube 71 receives a location button on the leg of a stretcher or on a tubular section attached to the leg of a stretcher, whereby the tube 71 and wheel 70 is attached to a stretcher, thereby converting it to a wheeled trolley. Swivelling type wheels may be fitted to the stretcher if desired.

Figure 10:
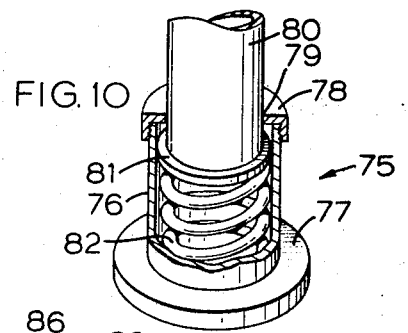
FIG. 10 is a perspective view of a stretcher corner supporting post or leg fitted with a spring suspension attachment.

A further attachment is shown in FIG. 10 which is a perspective view of a spring suspension attachment 75, partially broken away, for a stretcher leg or supporting post. The attachment 75 comprises a cylindrical housing 76 closed at one of its ends by a circular base 77 and at its other end by a cap member 78 screwed to the housing 76. The cap member 78 has an aperture 79 therein for snugly receiving a leg 80 of a stretcher. The location button on the leg 80 (not shown) can be depressed to allow the leg to enter the attachment 75. Within the housing 76 is a circular vertically movable platform 81 resiliently mounted on a coil spring 82, the other end of which rests on the base 77. The leg 80 is supported on the platform 81 and, with one of these attachments mounted on each stretcher leg, shock to a patient on the stretcher transported in a vehicle is minimised.

Figure 11:
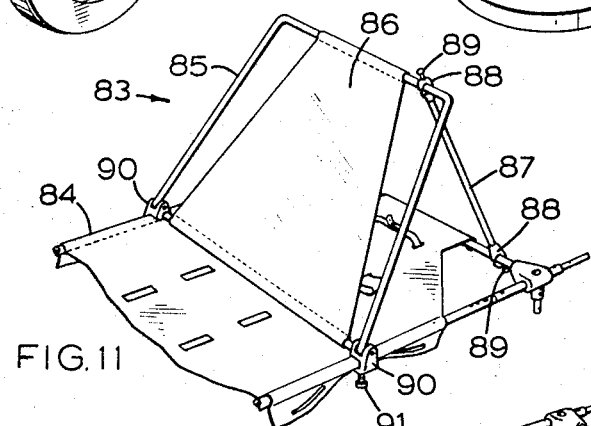
FIG. 11 is a perspective view of an adjustable back support attachment for a stretcher when used as an emergency operating table.

Another attachement is a back rest 83 shown in perspective on a broken away portion of a stretcher 84 in FIG. 11. The back rest 83 comprises a substantially rectangular tubular frame 85, which can, if desired, be made in joined sections so as to be collapsible, with a taut flexible sheet 86 of canvas or other suitable material stretched across the frame 85 and an adjustable rear supporting post 87 between the frame of the stretcher 84 and the frame 85, having brackets 88 thereon complete with pinch screws 89, to allow adjustment of the angle of the back rest. The frame 85 is secured to the frame of the stretcher 84 by being pivotally mounted in brackets 90 which are mounted on the stretcher frame and locked thereto by pinch screws 91. Installation of the back rest 83 on the stretcher 84 allows the stretcher to be used as an emergency adjustable operating table.

Figure 12:
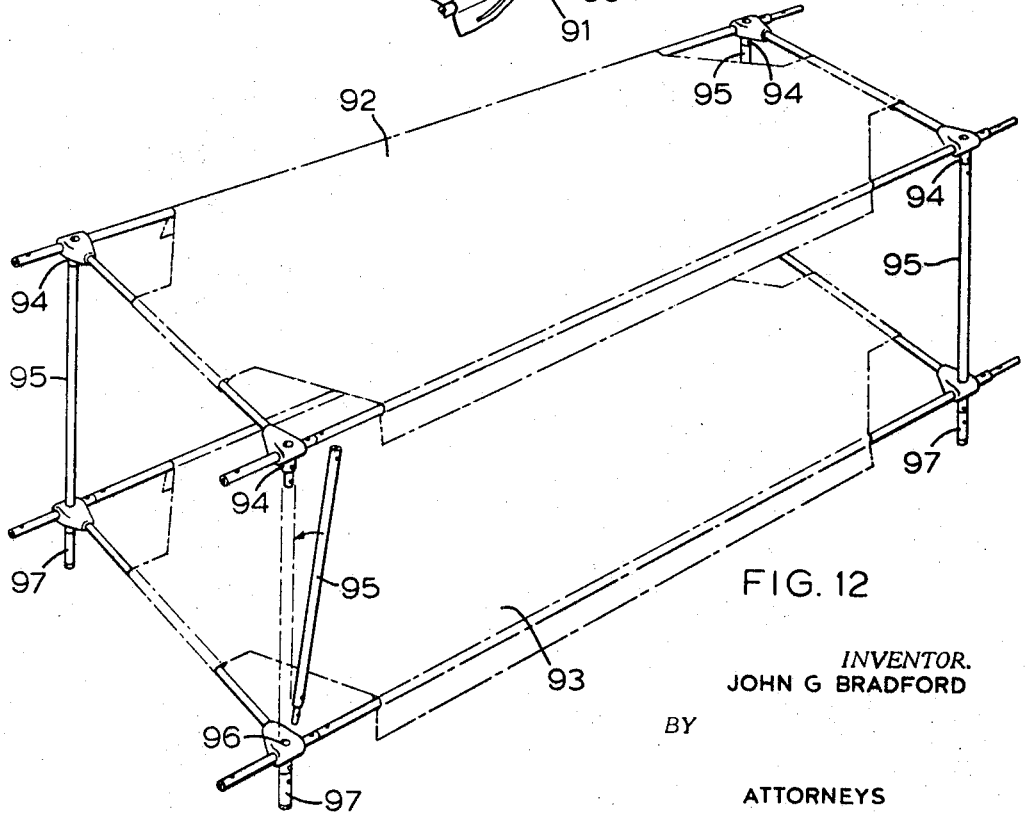
FIG. 12 is a perspective view of another embodiment of the invention showing two stretchers assembled to form a two-tier bunk.

FIG. 12 illustrates another embodiment of the invention, with a perspective view of a two tier bunk formed from two stretchers 92, 93 being shown (the fabric on the stretcher being depicted in dotted outline). To form the bunk, legs 94 of the stretcher 92 are seen to be spigotted into the receiving ends of tubular sections 95 from extra side frame sections, one of which is shown in FIG. 10 removed from its location on the bunk, with the spigot ends of the tubular sections 95 then being inserted into open upper ends 96 of the tubes forming the legs 97 of the lower stretcher 93. Extra bunk tiers may be added, if required. Furthermore, wheel attachments may be fitted to each leg or supporting post 97 of the lower stretcher 93 to form a two tier trolley.

The easy adaptation of a stretcher or stretchers for another use is illustrated by the perspective view of a bivouac tent in FIG. 13. The bivouac tent is formed by adding a collapsible inverted U-shaped tubular frame member 98 to a stretcher 99 by mounting the frame 98 in the upper open ends of legs 100 on one side 101 of the stretcher. A rectangular sheet 102, of canvas or other flexible material (shown partially broken away), with two triangular side pieces 103, joined to the sheet 102, as shown, or capable of being joined thereto by clip, press or contact fasteners, is fitted over the stretcher 99 and frame member 98 and the sheet 102 is secured to the ground on each side by pegging loops 104 (not shown on the rear portion of the sheet 102) secured by suitable pegs. The sheets 102 can be made with an overlap to enable them to be positively joined to one another to permit the erection of a continuous structure by joining stretchers together end to end and using a plurality of the sheets 102 and the frame members 98. If central supporting poles are required these can be formed by using a plurality of conjoined tubular sections from litter side frame members.

The method of securing a casualty to a stretcher embodying the invention is illustrated in FIG. 14. The harness for securing a casualty 105 to a stretcher 106 comprises a strap or cord 107, the centre of which is clipped to sheet 108 of the stretcher by fastening means, such as a press stud fastener (not shown), so as to prevent it from becoming detached and lost. The strap 107 can be easily stowed by folding it upon itself, the folded ends being threaded through two of slots 109 in the sheet 108. Referring to FIG. 1, a securing strap 110 is shown, stowed as just described. One end of the strap 107 has a movable buckle fastener 111, which can be secured at any position along the strap 107 so that the functioning length is adjustable. The casualty 105 is secured to the stretcher 106 by passing each end over the body, through the slots 109, around the back of the sheet 108 and again through the slots 109, as shown in FIG. 14, the free ends of the strap being fastened at the ankles of the casualty 105 in this particular instance. An additional strap 112 is provided for bracing the head, which can be used also to secure the stretcher 106 when folded and rolled.

The harness used in conjunction with the stretcher as shown in FIG. 14 will permit a casualty of any height and build to be securely fastened to the stretcher and is particularly useful in mountain rescue operations or as an airborne stretcher for carrying a casualty by plane or helicopter. By its adaptability, it permits ordinary rigid splints to be applied with ease and comfort and without any special binding being required. Extra support and restraint of a casualty is afforded by connecting the side flaps 113 of the sheet 108 together by means of straps or cords providing an extra outer casing under which extra protective material may be placed if required. Should the carrying space available be too confined to allow adequate maneuverability of the stretcher, side frame members 114 may be omitted and the casualty carried by means of the handgrips formed by slots 115 to where there is more space and the side frame members 114 can be re-inserted in sleeves 116 to make the stretcher rigid. In this respect the stretcher can be used to replace non-rigid types of stretchers with the added advantage of versatility and rigidity, when permissible and desirable.

A further embodiment of the invention is shown in FIG. 15, which is a perspective view of a broken-away portion of a ladder formed by joining stretchers together. Thus, the spigot handles 117 of stretcher 118 are connected into receiving handles 119 of stretcher 120 to form the ladder, with further stretchers being attached to form the length of ladder required, if necessary, intermediate foot supports on the ladder are provided by slots 121 (one of which is shown) in sheets 122 (shown in outline) on the stretchers forming the ladder.

Still another embodiment of the invention is shown in FIG. 16, which is an elevational view of an I-beam structure formed from two stretchers, useful as a weight supporting device, such as a platform or as a temporary bridge suitable for bridging ravines and capable of carrying lightweight vehicles with the addition of track members placed on top of the structure. Thus, a first complete stretcher frame 123 is placed on a second complete stretcher frame 124 and attached thereto by inserting the spigot portions of legs 125 into the open upper ends of legs 126 of the lower stretcher frame 124, positive locking between the legs being provided by the location buttons on the spigot legs entering the location holes in the upper ends of the lower legs. Strips of wood 127 or other suitable material of the required thickness, along with other supporting structures, such as side tube sections from another stretcher are laid between the upper and lower stretcher frames 123, 124 to act as stress distributors. The I-beam structure so illustrated and described is found to have considerable strength and rigidity. The vertically joined stretcher frames 123, 124 may be horizontally joined to other similar units by insertion of handle spigot ends 128 into handle receiving ends or by inserting other spigot ends into handle receiving ends 129 and other stretcher frames may be added to the structure vertically, according to the length and strength required. Intermediate supporting leg portions of desired length can, of course, be supplied by inserting end frame members at the joints between the side frame sections on the stretcher frame 124.

Figures 17, 18:
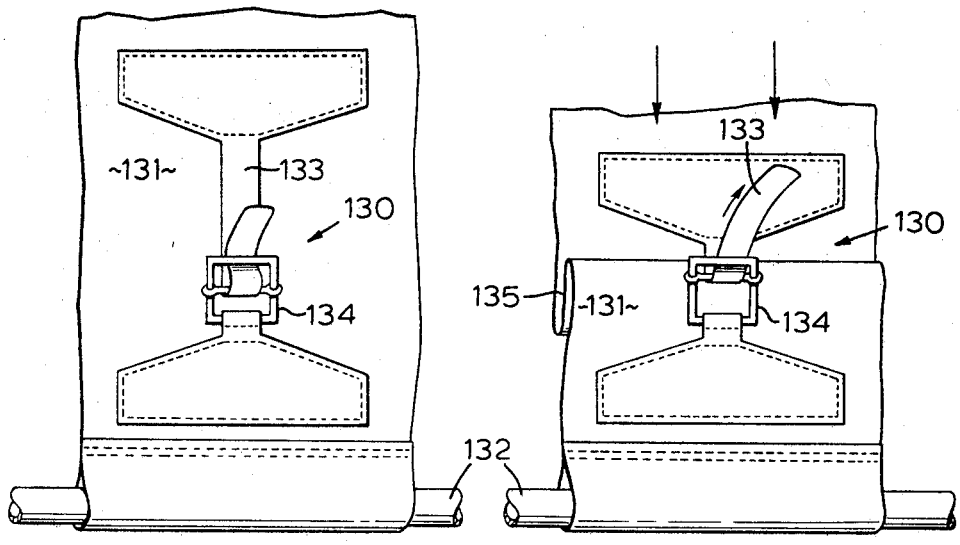
FIGS. 17 and 18 are fragmentary views of the canvas tightening strap which takes up slack in the canvas after erection of a stretcher.

FIGS. 17 and 18 are fragmentary views of a canvas tightening brace 130 for taking up the slack in sheet 131 of a stretcher after the stretcher has been assembled. The sheet 131 is shown attached to tubular connecting member 132. FIG. 17 shows strap 133 on the brace 130 inserted through buckle 134, but before tightening. FIG. 18 shows the strap 133 pulled through the buckle 134 to tighten the brace and pull up slack 135 in the sheet 131. Other types of tightening means may be used for pulling up the slack in the sheet. Thus, the sleeve on the sheet 131 through which the connecting member 132 is inserted may be replaced by two straps attached to the sheet and around the connecting member, two quick release buckles being used.

Figure 19:
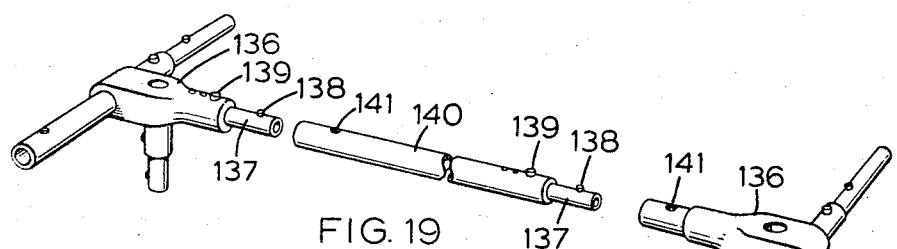
FIG. 19 is a broken perspective view of a modified form of end frame member for a stretcher shown in disassembled form.

FIG. 19 is a broken perspective view of a modified form of end frame member, shown disassembled, with connecting housing members 136 at each end. One of the housings 136 and one end of connecting member 140 are supplied with spigot members 137 containing spring catches with location buttons 138 thereon depressible by push buttons 139, similar to those described hereinbefore. The other of the housings 136 and the other end of the tubular connecting member 140 have receiving portions for the spigot members 137 containing location holes 141 for the location buttons 138. This modified form of end frame member, then, can be easily assembled and disassembled thereby providing a stretcher frame with even greater versatility. The connecting members 140 are advantageously made half the length of the sections of the side frame members of the litter so that two of the connecting members 140 are interchangeable with a side frame member section. In particular, the form of end frame member shown in FIG. 19 is particularly useful for the tent embodiment shown in FIG. 13 in using a one-piece fabric for the tent covering with the end triangular sections engageable with the removable tubular connecting member 140. In addition, no special frame for the tent is necessary since side frame members can be used as tent poles and cross bars in conjunction with the disengageable housings 136.

Figure 20:
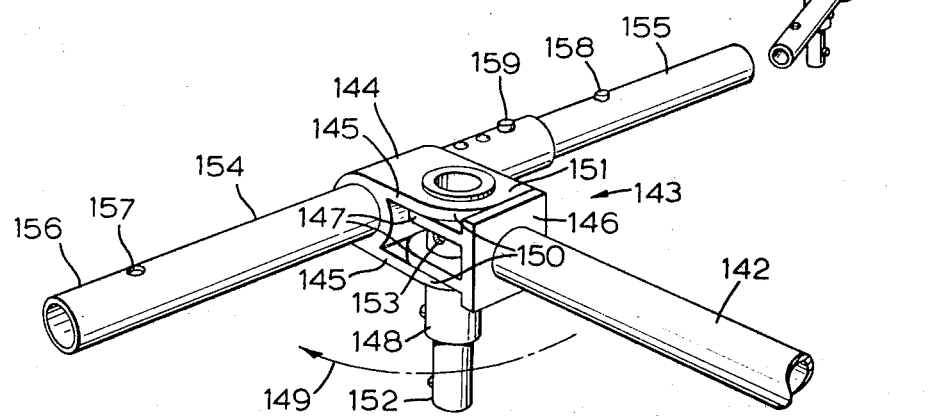
FIG. 20 is a perspective view of a modified form of housing member on an end frame member for a stretcher.

FIG. 20 is a perspective view of one end of another modified form of end frame member for a stretcher which pivotally collapses into a more compact and easily stored section. The end frame member comprises a tubular connecting member 142 (only a portion of which is shown) subtended at each end by a housing 143 (only one of which is shown). The housing 143 is composed of an outer member 144 having wing portions 145 thereon, with a circular hole centrally located in each of the wing portions 145, and an inner member 146 also having wing portions 147 thereon with a circular hole located in each of the wing portions 147, of slightly larger size and aligned with the holes in the wing portions 145. A tube 148 is located in the housing 143, projecting through the aligned holes and integrally attached to the outer member 144. The inner member 146 is free to rotate on the tube 148 through in the order of 90° in the direction of arrow 149, with shoulders 150 of the outer member 144 rounded and the opposite shoulders 151 (one being shown) squared. A nylon bearing may be provided in the assembly to prevent seizing between the moving parts. The tube 148 has a lower spigot portion 152 and a location hole 153 therein for the location buttons of spigot tubes inserted into the upper end of the tube 148. The inner member 146 has the tubular connecting member 142 integrally connected thereto and the outer member 144 has a connecting tube 154 integrally connected therethrough for the attachment of litter side frame members with one end of the tube 154 having a spigot end 155 thereon and the other end of the tube 154 being a receiving tube 156 with a location hole 157 therein for spigot location buttons. The spigot end 145 has a location button 158 on a spring member depressible by a push button 159. To make this modified end frame member even more compact, the spigot portion 155 of the tube 154 can be shortened considerably.

Various other modifications can be made to the present invention without departing from the scope and spirit thereof. Thus, for example, the tubular frame members and connecting members, as well as the flexible sheeting material can be made of any suitable plastic material. Furthermore, the side flaps 31 on the stretcher (see FIG. 1) can be replaced by loops along the tubular sleeves 28 to form extra carrying handles for use in confined spaces. Also, the form of spring fastener used to fasten different parts of the stretcher together, and described particularly in conjunction with FIGS. 2 and 3, may be of different construction. Instead of the flat spring steel strip 38, a U-shaped strip may be situated within the tube with a location button on each end of the strip projecting through holes in the tube to provide more effective fastening of one section of tube to another. As aforementioned, the depression buttons for the location buttons on spigot portions of the tubes may be eliminated. In addition, if the supporting structure is being used other than for a litter, the handle portions thereof (receiving and spigot tubes) may be shortened as desired.

It can be seen that the collapsible supporting structure of the present invention has many different uses. It can be used as various types of stretcher, among which are a Neil-Robertson type stretcher, an airborne stretcher for civilian and military use (and in this regard it is to be noted that lifting cables can be easily and securely attached to the side frame members and the end frame members for hoisting the stretcher into a cargo plane, a helicopter or a ship), a mountain rescue stretcher (adaptable to be run on skiis, if necessary) and a wheeled single or two tiered stretcher. Supporting structures embodying the invention may also be used for portable camp beds, single or double portable bunks, portable ladders and bridges and portable tents, to cite a number of examples.

The stretcher embodying the invention, with the addition of various sections of the supporting structure thereto, has many and varied medical uses. Thus, for example, the stretcher may be easily and quickly made into an orthopedic bed by inserting side sections vertically into the legs of the stretcher and placing a second stretcher frame on the posts so formed, thereby forming a usable orthopedic frame. The stretcher may be adapted for transfusion purposes by inserting a side section vertically into a stretcher leg and hooking a transfusion bottle over the open upper end of this side section. A Thomas' frame can be constructed by inserting end frame sections of a stretcher into the legs at the bottom of a stretcher on which an injured person is placed. The foot of the injured leg can then be strapped to the frame so formed. Limbs or necks can be put in traction using the stretcher of the invention, again with an end section inserted at the bottom or the head of the stretcher, as desired, wtih the leg or head of the patient strapped to the frame so formed, bandages advantageously being used to strap the head of a patient to the frame. The stretcher is then made higher at the foot end or the head end for leg traction and neck traction, respectively, using stretcher side sections attached to the spigot portions of the stretcher legs. Wheels can then be provided on the traction stretcher, if desired. Traction for a broken femur can be provided without the use of a Thomas' frame by strapping the patient's hips firmly in one position on the stretcher using the slots in the stretcher sheet and then putting the broken femur in positive traction and strapping the leg in position on the stretcher.

What I claim as my invention is:

1. A collapsible and portable stretcher device comprising a rectangular tubular frame having two end frame members and two side frame members engageable with the end frame members and a flexible sheet supported by the tubular frame and forming the bed of the stretcher, each of said end frame members comprising a tubular connecting member subtended at each end by a housing member connected thereto, each of said housing members having first and second tubes securely connected thereto and extending outwardly from opposite sides thereof substantially perpendicularly to said tubular connecting member and a supporting tube forming a leg for the stretcher connected into the housing member at right angles to the first and second tubes and the connecting member, said first tube being of larger diameter than said second tube at the ends thereof away from said housing member and said first and second tubes forming carrying handles for the stretcher, each of said side frame members comprising at least two tubular sections, the end of one tubular section releasably socketing securely into the end of the next adjacent tubular section, the first tube on each housing member and one end of each side frame member being so adapted that said one end releasably securely sockets into said first tube, the second tube on each housing member and the other end of each side frame member being so adapted that said second tube releasably securely sockets into said other end of said side frame member, and said flexible sheet being attached at each end to said tubular connecting members and having releasable attaching means along the sides thereof for attachment to said side frame members.

2. A stretcher device as claimed in claim 1 wherein the supporting tube is connected through the housing member and has an open upper portion thereon and a spigot tube portion on the lower end thereof adapted to releasably securely socket into said open upper portion.

3. A stretcher device as claimed in claim 2 wherein the first tube on the housing members and one end of each tubular section of the side frame members are spigot tubes of the same size as the spigot tube portion of the supporting tube on the housing members, and the second tube on the housing members and the other end of each tubular section of the side frame members are receiving tubes of the same size as the open upper portion of the supporting tubes in the housing members, each adapted to releasably securely receive any of said spigot tubes.

4. A stretcher device as claimed in claim 3 wherein each of the spigot tubes has a releasable spring clip means thereon and each receiving tube on the housing members, each other end of each tubular section of the side frame members and each upper portion of the supporting tubes have location holes therein adapted to receive the clip means therein.

5. A stretcher device as claimed in claim 1 wherein the tubular connecting member in each end frame member is releasably connected to the housing members at each end thereof.

6. A stretcher device as claimed in claim 5 wherein the housing members and the tubular connecting member have spigot tube and receiving tube sections thereon, said spigot tube sections being releasably secured in said receiving tube sections.

7. A stretcher device as claimed in claim 1 wherein the tubular connecting member is connected to the housing members by pivotal connecting joints.

8. A stretcher device as claimed in claim 1 wherein each side frame member has three tubular sections therein and a connecting cord runs through the tubular sections of each side frame member attached to the end sections of the side frame members and adapted to hold the side frame sections in each side frame member in one assembly when the side frame member is dissassembled.

9. A stretcher device as claimed in claim 8 wherein the connecting cord is elastic in tension and adapted to pull the tubular sections together and facilitate rapid assembly of the side frame member from the tubular sections.

10. A stretcher device as claimed in claim 1 wherein the flexible sheet has tubular sleeves along the sides thereof, through which the tubular side frame members are inserted, and tubular sleeves along the ends thereof through which the end frame tubular connecting members are inserted.

11. A stretcher device as claimed in claim 1 wherein the flexible sheet forming the bed of the stretcher has open slots therealong arranged in two parallel rows and adapted to receive harness straps for securing a person to the stretcher.

12. A stretcher device as claimed in claim 11 wherein at least two of the slots are enlarged to act as footholds and form intermediate rungs of a ladder to permit use of the stretcher as a ladder.

13. A stretcher device as claimed in claim 11 wherein the flexible sheet has flaps provided along the sides thereof, outside the tubular sleeves, with a row of slots in each flap, said flaps being adapted to be used as additional securing means and additional handgrips on the stretcher.

14. A stretcher device as claimed in claim 11 wherein the flexible sheet has a tightening brace at one end thereof adapted to take up the slack of the flexible sheet when the stretcher is assembled.

15. A stretcher device as claimed in claim 11 wherein a securing strap is folded and stowed in slots in the sheet and adapted to pass through the slots in the sheet and secure a person to the stretcher.

16. A stretcher device as claimed in claim 11 wherein a head strap is provided attached to the stretcher through slots in one end of the sheet and adapted to tie the stretcher parts in a bundle when the stretcher is disassembled.

17. A stretcher device as claimed in claim 1 wherein ski attachment members are provided therefor each comprising a tube member with a ski connecting portion at one end thereof and a tube receiving portion at the other end thereof adapted to releasably securely receive the supporting tube on each housing member on the end frame member.

References Cited
UNITED STATES PATENTS

| | | | |
|---|---|---|---|
| 1,347,808 | 7/1920 | Franklin | 287—54 |
| 2,394,245 | 2/1946 | Koller | 5—82 |
| 2,745,115 | 5/1956 | Reiss | 5—82 |
| 2,770,465 | 11/1956 | Dandurand | 5—82 X |
| 3,104,401 | 9/1963 | Davis | 5—82 |
| 3,110,912 | 11/1963 | Propst | 5—82 |
| 3,336,060 | 8/1967 | Bradford | 287—54 |

CASMIR A. NUNBERG, *Primary Examiner.*

U.S. Cl. X.R.

287—54; 5—114